(12) United States Patent
Blank et al.

(10) Patent No.: US 11,748,824 B2
(45) Date of Patent: Sep. 5, 2023

(54) SYSTEMS AND METHODS FOR SITE TRAVERSABILITY SENSING

(71) Applicant: Deere & Company, Moline, IL (US)

(72) Inventors: Sebastian Blank, Neuhemsbach (DE); Dohn W. Pfeiffer, Bettendorf, IA (US); Curtis R. Hammer, Bettendorf, IA (US)

(73) Assignee: Deere & Company, Moline, IL (US)

( * ) Notice: Subject to any disclaimer, the term of this patent is extended or adjusted under 35 U.S.C. 154(b) by 543 days.

(21) Appl. No.: 16/778,596

(22) Filed: Jan. 31, 2020

(65) Prior Publication Data

US 2021/0241390 A1 Aug. 5, 2021

(51) Int. Cl.
 *G05D 1/02* (2020.01)
 *G01C 21/20* (2006.01)
 (Continued)

(52) U.S. Cl.
 CPC ........... *G06Q 50/02* (2013.01); *A01B 79/005* (2013.01); *A01D 41/1277* (2013.01);
 (Continued)

(58) Field of Classification Search
 None
 See application file for complete search history.

(56) References Cited

U.S. PATENT DOCUMENTS

| 10,139,234 B2 | 11/2018 | Matthews |
| 10,295,998 B2 | 5/2019 | Yokoyama |

(Continued)

FOREIGN PATENT DOCUMENTS

| WO | WO2015006600 A1 | 1/2015 |
| WO | 2017/050548 | 3/2017 |

(Continued)

OTHER PUBLICATIONS

Shneier et al., "Performance Evaluation of a Terrain Traversability Learning Algorithm in the DARPA LAGR Program," Intelligent Systems Division National Institute of Standards and Technology, 8 pages.

(Continued)

*Primary Examiner* — Adam D Tissot
*Assistant Examiner* — Laura E Linhardt
(74) *Attorney, Agent, or Firm* — TUCKER ELLIS LLP; Michael G. Craig; Heather M. Barnes

(57) ABSTRACT

One or more techniques and/or systems are disclosed for identifying traversability of a site. Site conditions of a target site affecting traversability can be identified using real-time or historical data. Soil conditions, weather conditions, moisture levels, and other factors may be used to determine whether a target site is traversable by a target piece of equipment. The traversability information can be identified for a target area, that comprises a target site, and a traversability map can be generated for the site. Target equipment specifications can be used to determine whether the target equipment may effectively traverse the target site based on the traversability map. Further, a traversability path may be generated for a piece of target equipment based on the traversability map, site conditions, and the equipment specifications. Additionally, site management may be enhanced using the site condition data to plan traversability of target equipment at the target site.

20 Claims, 12 Drawing Sheets

(51) Int. Cl.
    *B62D 15/02* (2006.01)
    *B62D 6/00* (2006.01)
    *B60W 10/20* (2006.01)
    *B60W 10/30* (2006.01)
    *B60W 30/00* (2006.01)
    *A01B 69/04* (2006.01)
    *B60C 23/00* (2006.01)
    *G06Q 50/02* (2012.01)
    *A01B 79/00* (2006.01)
    *A01D 41/127* (2006.01)
    *A01G 25/16* (2006.01)
    *B60W 40/10* (2012.01)
    *G01N 27/22* (2006.01)
    *G07C 5/00* (2006.01)

(52) U.S. Cl.
    CPC ....... *A01D 41/1278* (2013.01); *A01G 25/167* (2013.01); *B60W 40/10* (2013.01); *G01N 27/223* (2013.01); *G07C 5/008* (2013.01); *B60W 2300/152* (2013.01); *B60W 2520/26* (2013.01)

(56) References Cited

U.S. PATENT DOCUMENTS

| | | |
|---|---|---|
| 2005/0192749 A1 | 9/2005 | Flann et al. |
| 2016/0073573 A1 | 3/2016 | Ethington et al. |
| 2016/0247075 A1 | 8/2016 | Mewes et al. |
| 2016/0274562 A1 | 9/2016 | Sugihara et al. |
| 2019/0128690 A1* | 5/2019 | Madsen ................ G05D 1/027 |
| 2019/0129435 A1* | 5/2019 | Madsen ................ B62D 6/001 |

FOREIGN PATENT DOCUMENTS

| | | |
|---|---|---|
| WO | WO2017042821 A1 | 3/2017 |
| WO | 2018/086764 | 5/2018 |

OTHER PUBLICATIONS

Braun et al., "Visual Terrain Traversability Estimation using a Combine Slope/Elevation Model," University of Kaiserslautern, 8 pages.

"The Robust Autonomous Vehicle for Off-road Navigation," RAVON, pp. 13-14.

European Search Report issued in counterpart application No. 20214336.8 dated Jan. 29, 2021 (09 pages).

\* cited by examiner

SYSTEMS AND METHODS FOR SITE TRAVERSABILITY SENSING

BACKGROUND

Farmers, construction sites, and other outdoor industrial sites utilize modern machinery such as tractors, trucks, site conditioners, ground working implements, combine harvesters, sprayers, and others large pieces of equipment. For example, site conditions of a target field or group of filed may be a major limiting factor of a farming operation through the whole growing cycle, as various site conditions may delay or even disrupt a task to be carried, which negatively impact the yield potential of the field and thus the profitability of the operation. As an example, the ability to enter a site, field, etc. can be based on site soil properties, environmental conditions, recent weather, and machine parameters such as weight, propulsion system type (track/tire configuration parameters). One of several potential issues is the risk to get "stuck" in soft ground by losing traction and sinking into the soil, possibly causing damage to both the equipment and site. This is especially evident with a trend to increase in machine size, some already exceeding 20 metric tons in weight.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems are described herein for systems and techniques for identifying site conditions, for example, in real-time and/or historically, to identify potential issues for a target site, using target equipment. As an example, soil conditions, current and/or historical weather, moisture level, and more can be combined with equipment specifications to identify whether the target equipment may effectively traverse the target site. In some implementations, the site condition data may be used in real-time to map appropriate paths for the target equipment; and/or may be used as part of a site management information system to schedule appropriate equipment for desired tasks, at appropriate times.

In one implementation of a system for identifying traversability of a site by equipment, a traversability determination component can use a processor to generate traversability data. The traversability data can be based on location data indicative of a location of a target site; and soil data indicative of soil conditions at the target site stored in memory. Further, the traversability data can be indicative of conditions at the target site related to traversability at the target site. In this implementation, a traversability map generation component can generate a traversability map for a target area comprising the target site. The traversability map can be generated based on traversability data received from the traversability determination component; equipment identification data indicative of target equipment specifications for traversing the target site; and target area data indicative of a desired target area that comprises the target site.

In one implementation, a site traversability management component can be used to manage traversability of the target site. In this implementation, the site traversability management component can receive the traversability map, which results in a determination of target site traversability for the target equipment. In another implementation, a display can receive the traversability map to render a visual representation of the traversability map of the target area. The map can be viewable by an operator of the target equipment.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

Figure 1A:
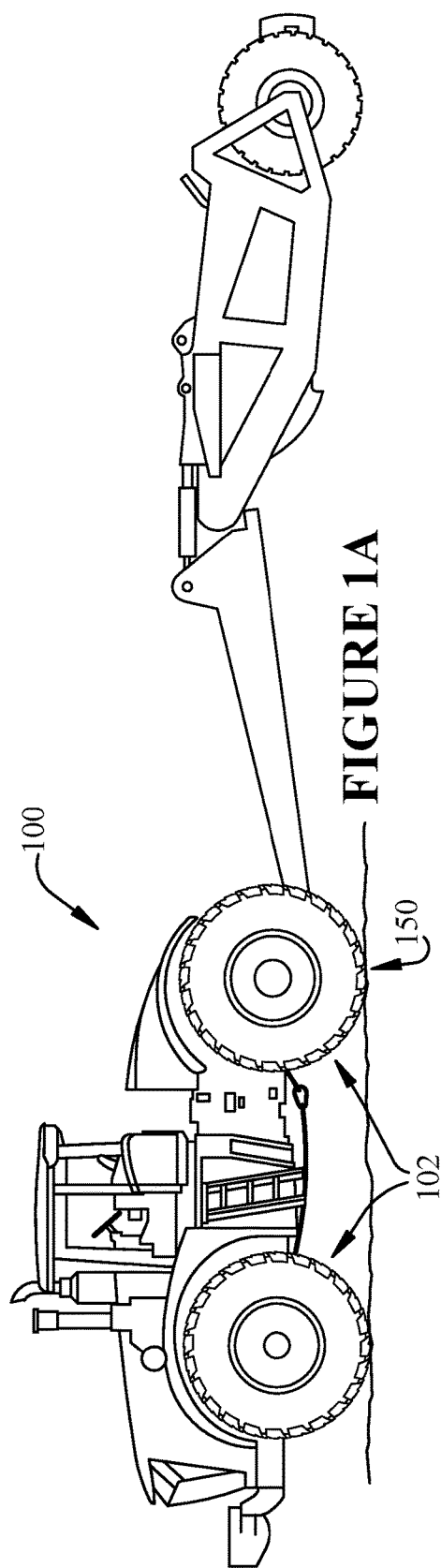
FIGS. 1A and 1B are component diagrams illustrating one embodiment of an example piece of equipment that may be implemented with one or more systems described herein.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

In one aspect, a system can be devised that can identify traversability conditions for a target site, for target equipment. That is, for example, an example system may be able to identify when site conditions are amenable for a particular piece of equipment to traverse the target site for a desired task, such having the equipment effectively move on the site without getting stuck, damaging the site, and/or being able to perform a desired task, such as ground engaging work (e.g., tillage, seeding, earth moving, etc.). Site soils and soil conditions with respect to water saturation can lead to equipment traversability and/or use issues, particularly when the equipment is large, heavy, and/or has a small footprint or point of contact. In some situations, the equipment can get bogged down in the ground, which may lead to equipment damage, loss of use, and/or site damage. In other situations, the equipment may not be able to effectively perform a desired task, such as tilling, planting, earth moving, harvesting, etc. In this aspect, an example, can identify site conditions that allow for desired traversability of the target site by a target piece of equipment. It should be understood that when the term "traverse," "traversing," "traversability," and the like are used herein it refers to traveling, driving or otherwise moving across a site using target equipment, and/or performing a desired at the site using the target equipment. Of note, in some implementation, the site conditions of the target site can be identified using the systems and techniques described herein independently of a target piece of equipment. That is, for example, information regarding site conditions of the target site may be utilized for various types of equipment, and/or for other agronomic purposes, such as water management at the target site.

Figure 1B:
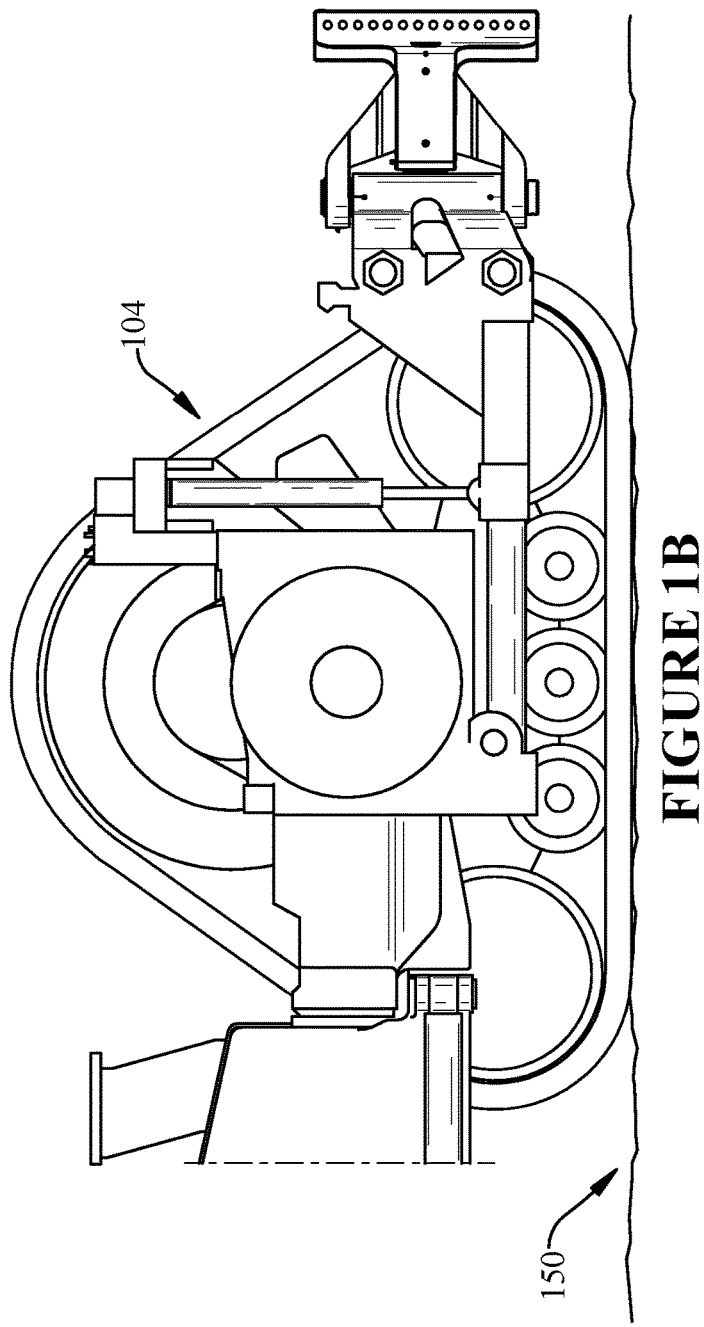

As an illustrative example, a piece of target equipment may comprise a tractor or similar vehicle used in agriculture or construction. FIGS. 1A and 1B is a component diagram illustrating an example tractor 100 that may be implemented with one or more portions of the systems described herein. In this example, the tractor 100 comprises wheels 102 that respectively provide a point of contact 106 with the ground 150. In an alternate implementation, the tractor 100 can comprise track assemblies 104 disposed at one or more of the wheel location, instead of the wheels 102. In this implementation, for example, the track assemblies 104 may be used to spread out the load of the tractor 100, as the tracks provide a larger footprint or point of contact with the ground 150.

Figure 2:
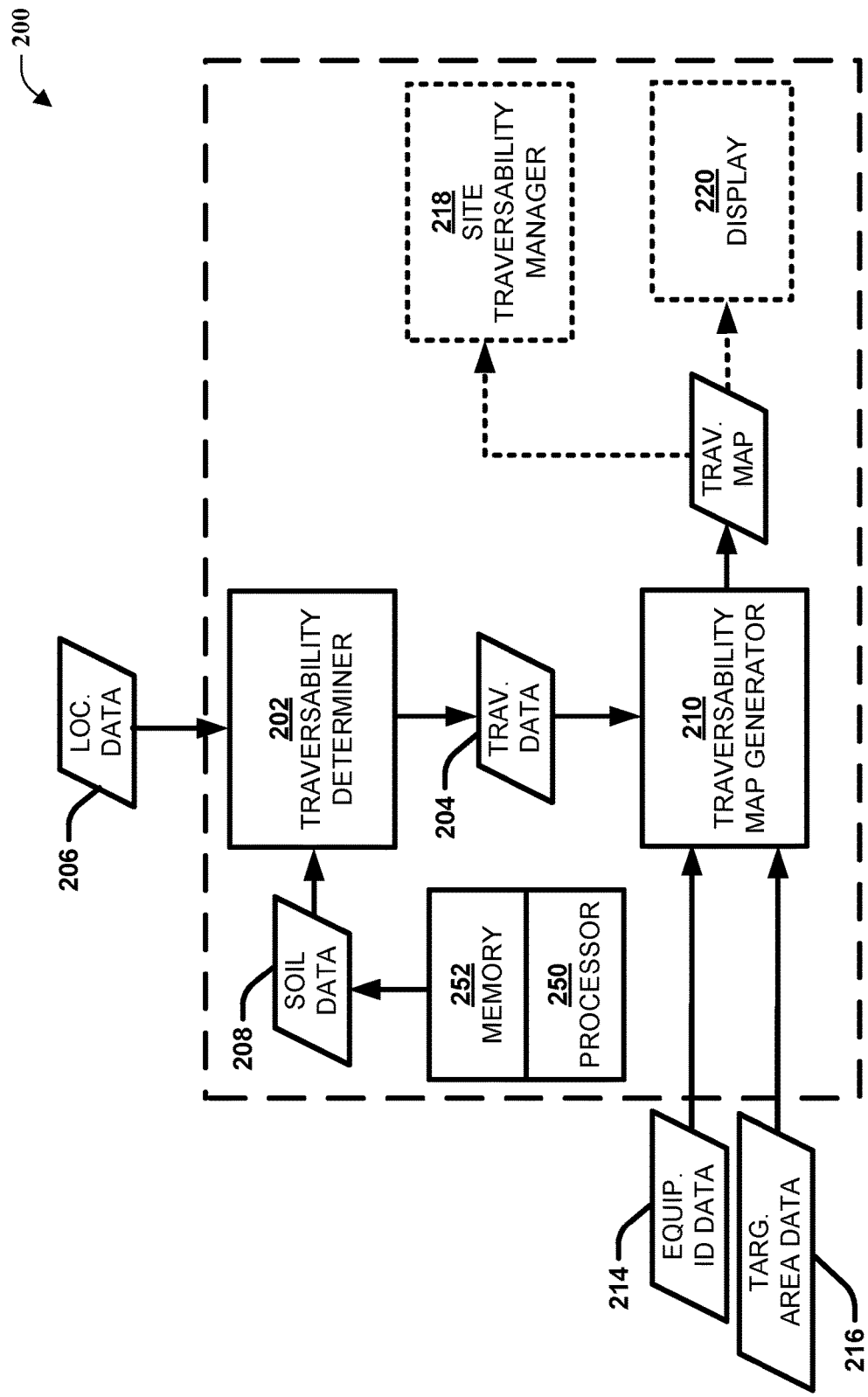
FIG. 2 is a schematic diagram illustrating an exemplary implementation of a system for identifying traversability of a site by equipment.

FIG. 2 is a schematic diagram illustrating one implementation of an exemplary system 200 for identifying traversability of a site by equipment. In this implementation the exemplary system 200 comprises a traversability determination component 202 that uses a processor 250 to generate traversability data 204. The traversability data 204 can be generated based at least on location data 206 that is indicative of a location of a target site. As an example, location data can comprise map coordinates, global position system (GPS) location data, or descriptive identification of the location of the target site. Further, for example, the target site can comprise the ground location (e.g., farm field or portion thereof) intended to be traversed by a target piece of equipment (e.g., ground-working equipment, such as an agricultural tractor and tillage equipment).

Additionally, the traversability data 204 can be generated based at least on soil data 208 indicative of soil conditions at the target site stored in memory 252. That is, for example, soil conditions may comprise information about the soil types, soil characterization, composition, and other information that indicates soil conditions. As an example, soil maps are available in the United States that have been developed by the U.S. Geological Survey, local county soil districts, and other private entities that identify soil types, composition, and other characteristics for locations across the U.S. Other countries have developed similar soil surveys for their respective locations. These surveys are just one example of data that can be stored in memory and used to help generate the traversability data. Further, target site managers (e.g., farmers) may perform sampling of soil conditions periodically or at routine intervals to provide site condition data to a site management information system (e.g., farm management information system (FMIS)). That is, for example, a particular soil type, composition, and/or type and presence of plant cover may be more susceptible to standing water and/or saturation point than others, and may provide for different traversability conditions. This information may be indicated by the soil data 208, which can help determine whether a particular piece of equipment can traverse the target site without potential issues.

In this implementation, the traversability data 204 is indicative of conditions at the target site that are related to traversability at the target site, by the target equipment. That is, for example, the location data 206 can identify the target site, which can help identify which soil data 208 will be used, based on the pre-identified soil data stored in memory 252. The identified soil data, for example, can help the traversability determination component 202 determine the traversability data 204 for the target site.

As illustrated in FIG. 2, the exemplary system 200 comprises a traversability map generation component 210 that generates a traversability map 212 for a target area comprising the target site. The traversability map generation component 210 can generate the traversability map 212 based at least on the traversability data 204 that is received from the traversability determination component 202. Further, the traversability map generation component 210 can generate the traversability map 212 based at least on equipment identification data 214 that is indicative of target equipment specifications for traversing the target site. That is, for example, the target equipment may have specifications that include the weight, type of ground contact (e.g., wheels and type, tracks and type), torque at respective axles, dimensions, towing capacity, downforce capacity, etc., which can be indicated by the equipment identification data 214. In this way, for example, the traversability map generation component 210 can combine the traversability data 204 with the equipment identification data 214 to determine whether the equipment may traverse the target site in a desired manner (e.g., without getting stuck, damaging the site, or being ineffective at a desired task such as tilling or planting).

Additionally, the traversability map generation component 210 can generate the traversability map 212 based at least on a target area data 216 indicative of a desired target area that comprises the target site. For example, the desired target area can comprise an area, such as a farm, farm field, construction site, or other ground area that includes the target site (e.g., a farm field or portion, a portion of a construction site, or portion of the target area). In this example, the target area data 216 can comprise map coordinates, GPS information, or other information that identifies the boundaries of the desired target area. In this way, the traversability map 212, generated by the traversability map generation component 210, can comprise a map of the desired target area with indications of traversability for the target equipment included on the map. For example, the map will indicate where the target equipment can effectively traverse in a desired manner, and/or to perform a desired task.

As illustrated in FIG. 2, in one implementation, the exemplary system 200 can comprise a site traversability management component 218 that can be used to manage traversability of the target site. In this implementation, the site traversability management component 218 receives the traversability map 212, which results in a determination of target site traversability for the target equipment. That is, for example, the traversability map 212 can identify traversability locations at the target area for the target equipment. In this example, the traversability management component 218 can determine whether the target site is comprised in an area of the traversability map identified as traversable by the target equipment. In this example, the determination of traversability can be used by an operator of the equipment to identify whether to, or when to, use the target equipment at the target site.

In another implementation, the exemplary system 200 can comprise a display 220 receiving the traversability map 212 to render a visual representation of the traversability map of the target area viewable by an operator of the target equipment. As an example, the display 220 can be disposed in an operator's cab of a vehicle (e.g., target equipment) to be viewable by the operator of the vehicle. In this example, the traversability map 212 can be displayed on the display 220 so that the operator can identify sites (e.g., the target site) within the target area that the vehicle (e.g., a towed equipment) can effectively traverse during operation. In this way, the operator may be able to avoid traveling over areas where traversability is not advised, and/or can plan for a desired operation at the target site.

Figure 3:
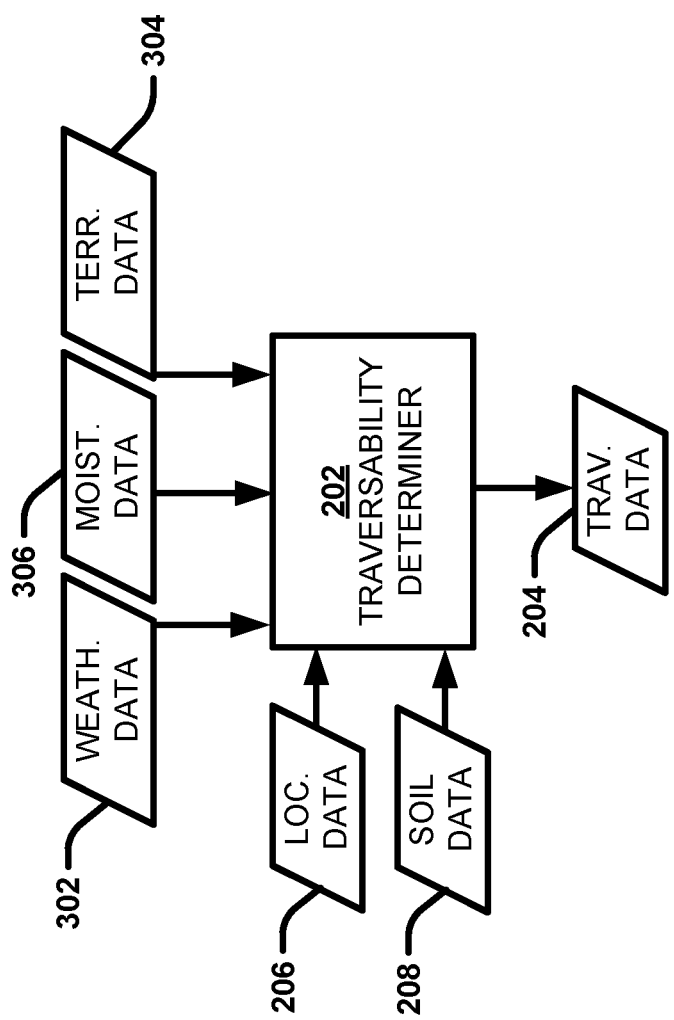
FIG. 3 is a schematic diagram illustrating one implementation of one or more portions of one or more systems described herein.

In one implementation, as illustrated in FIG. 3, the traversability determination component 202 can generate the traversability data 204 based at least on weather data 302 that is indicative of weather at the target site. As an example, current, past, and future predicted weather may have an effect on the traversability of the target site by the target equipment. That is, for example, a past weather event may have provided a known amount of precipitation at or near the target site. In this example, the impact that the identified precipitation has on traversability may be determined based on prior, known site conditions having similar data (e.g., similar combination of soil and weather data). Further, for example, current and future weather data may also provide information that can be compared with known site conditions to determine traversability for the target site, for the target equipment.

As illustrated in FIG. 3, the traversability determination component 202 can generate the traversability data 204 based at least on terrain data 304 that is indicative of indicative of terrain at the target site. As an example, the terrain at the target site may impact traversability for the target equipment. For example, a sloped terrain may affect traversability in combination with the soil conditions, and/or weather data. In some situations, target equipment may not be able to effectively traverse a target site having a certain type of terrain, soil, and weather conditions. As another example, a valley or depression at a target site may retain or collect greater amounts of water from a weather event. In this example, in combination with the soil data, that site may not be effectively traversable by the target equipment, or may be traversable using different equipment.

As illustrated in FIG. 3, the traversability determination component 202 can generate the traversability data 204 based at least on moisture data indicative of soil moisture level at the target site. For example, moisture data can be identified from site testing, or other analysis, collection of precipitation data, visual confirmation, remote sensing from aerial device (e.g., satellite, drone, etc.). As an example, moisture data may comprise the presence of water at various levels of the soil. For example, typically, surface and top soil moisture levels may be more relevant to traversability than subsoil moisture levels. Moisture presence at different soil levels may be relevant where slopes (e.g., for stability) and/or water table levels are important. The moisture data, in combination with the soil data, may help determine traversability for the target equipment, and/or may help identify alternate equipment for use at the target site.

In one implementation, an example system, such as the exemplary system 200 of FIG. 2, can comprise a sub-system that collects and analyzes real-time, in-situ data at a target site related to traversability of the target equipment. In some implementations, the real-time, in-situ data can be used to determine site traversability in real-time, for example, allowing an operator of the equipment to identify traversable locations for the equipment. In some implementations, the real-time, in-situ data can be shared (e.g., communicated over a communications network) between equipment/vehicles in a fleet of vehicles at a target site, and/or communicating with a site management information system. In this way, for example, site traversability for various equipment may be identified using real time data in combination with other know site condition data. Further, in some implementation, the real-time, in-situ data can be used to update a traversability map, and/or train a traversability system to improve analysis and decision making for generating traversability maps.

Figure 4:
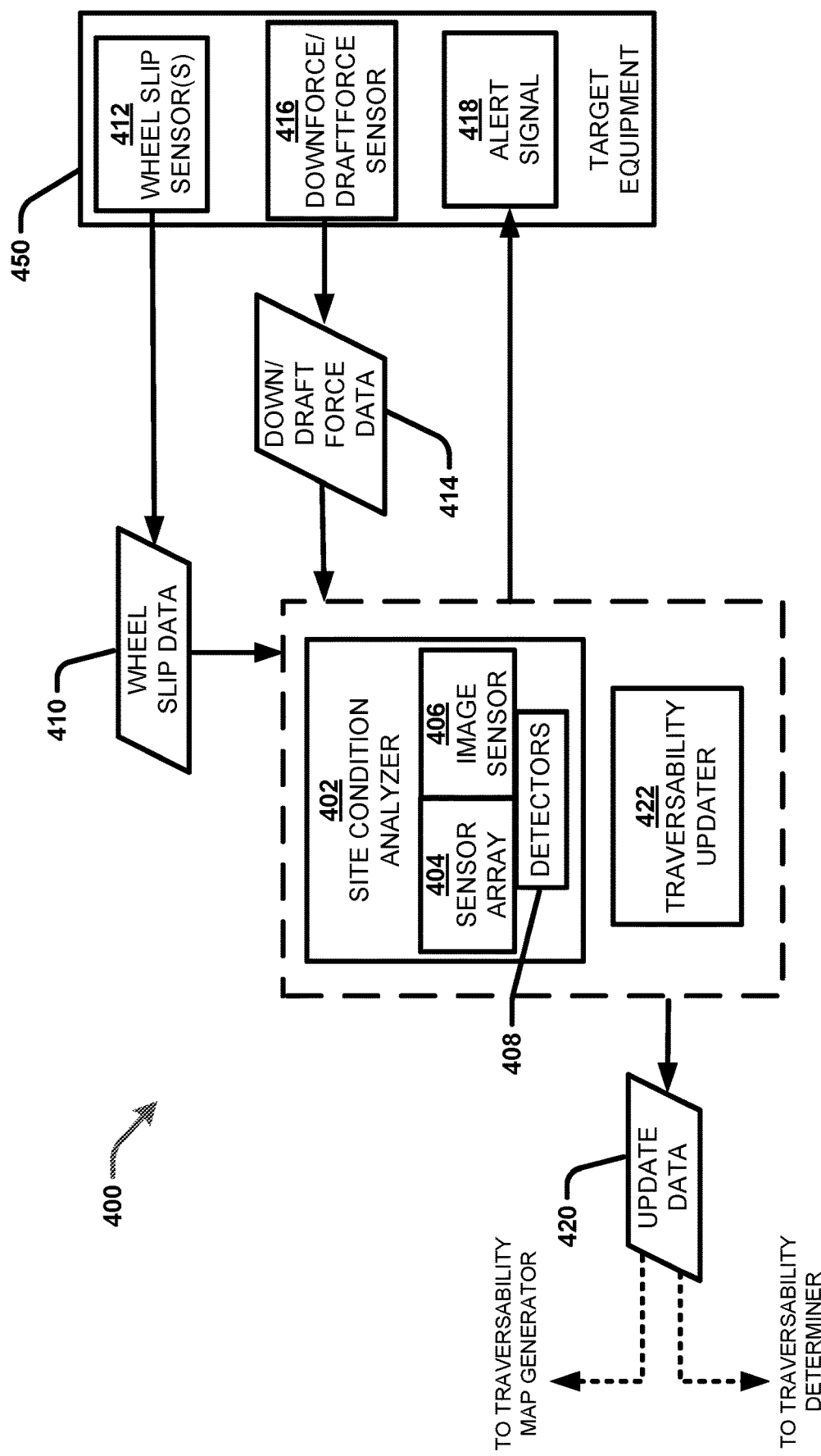
FIG. 4 is a schematic diagram illustrating one implementation of one or more portions of one or more systems described herein.

FIG. 4 is a schematic diagram illustrating one example implementation of at least a portion of a sub-system 400 for collecting real time, in-situ data related to traversability. In this implementation, the system 400 can comprise a site condition analyzing component 402. The site condition analyzing component 402 can comprise a sensor array 404 (e.g., comprising one or more sensors, such as disposed on the target equipment, vehicle, in-place stationary site, drones, etc.) to detect one or more site conditions in real-time. In this implementation, the site condition analyzer 402 can generate real-time data indicative of real-time site conditions related to traversability. As an example, real time site conditions can comprise soil types/conditions, moisture levels, terrain, weather, ground conditions, and more. These site conditions can help determine site traversability, and may be used to train the traversability determination component (e.g., 202), and/or the traversability map generation component (e.g., 210), to improve traversability outcomes for target equipment under similar conditions.

In one implementation, the site condition analyzing component 402 can comprise an image sensor 406, such as associated or comprised in the sensor array 404. In various implementations, the image can use one or more of the following to generate image data: a visible light detector, such as a charge-coupled device (CCD), active pixel sensor (APS), or other sensors; an infrared sensor, that captures images of passive or active infrared light; a polarized light detector; an electromagnetic wave detector, such as a radar device; an active acoustic imaging sensor; and/or a laser light detector. As an example, various types of electromagnetic radiation detectors 408 may be utilized (e.g., including for radio waves, microwaves, infrared, (visible) light, ultraviolet, X-rays, and gamma rays), and other imaging detectors 408, such as sonic wave emitters/sensors. These detectors 408 can be used to produce various types of images of the target site to identify conditions related to traversability. That is, for example, moisture content, soil types and characteristics, terrain, object detection, and other conditions may be derived from image data generated by the various detectors 408.

In one implementation, the site condition analyzing component 402 can generate real-time data indicative of real-time site conditions related to traversability based at least on real-time wheel slip data 410. The wheel slip data 410 can be received from one or more wheel slip sensors 412 that are disposed on the target equipment 450. As an example, the wheel slip sensors 412 can comprise one or more components that directly or indirectly detect wheel slippage. That is, for example, wheel slippage can be detected by identifying how the transmission operates in relation to forward movement of the vehicle, thereby inferring the slippage instead of direct detection. In other examples, some equipment may have direct measurement sensor(s) to detect wheel slippage. The wheel slip data can be indicative of an amount of wheel slippage of one or more wheels of the target equipment 450. As an example, the driven/powered wheels of equipment, such as tractors, provide a certain amount of torque and power. Under certain conditions the wheels may slip relative to the ground, instead of translating the equipment proportionally to the amount of rotation of the wheel (e.g., or track). In this example, the wheel may rotate more in relation to the proportional linear translation of the vehicle (e.g., slip). The wheel slip sensor(s) 412 can detect the amount of slippage, and provide the wheel slip data 410 indicative of this slippage amount to the site condition analysis component 402. For example, wheel slippage may be detected by measuring wheel rotation speed and comparing (e.g., in ratio) to movement of the equipment (e.g., using a locator, speed detection, and/or GPS). Increased wheel slippage may be indicative of site condition (e.g., muddy soil) that limit the ability of the equipment to traverse the target site. Little or no wheel slippage may be indicative of favorable site conditions for traversability.

In some implementations, the site condition analyzing component 402 can generate real-time data indicative of real-time site conditions related to traversability based at least on real-time force data 414. The real-time force data 414 can be received from a force sensor 416 disposed on the target equipment 450 that detects one or more of down force and draft force. The force data 414 can be indicative of an amount of downforce applied by a piece of towed equipment to the target equipment, and/or the amount of draft force applied by the towed equipment. That is, for example, a tractor may tow a ground working implement (e.g., tillage, seeder, scraper, etc.), and the implement imparts downward force on the rear of the tractor, along with a draft force. The downward force is typically applied to the rear axle, for example, and the draft force results from the amount of force needed to tow the implement for the task. As an example, the amount of force (e.g., downward or draft) can have an impact on the traversability of the equipment at the target site, in combination with other site conditions. For example, muddy soil conditions may reduce traversability for equipment detecting a large down or draft force, such as from a large piece of towed equipment, or one that has a large contact or impact with the ground.

As illustrated in FIG. 4, the example system 400 can comprise an alert signal 418 that indicates a real-time alert to the operator of the target equipment. The real-time data, such as from the sensor array 404, wheel slip sensor 412, force sensor 416, may be indicative of traversability threshold that is not met for the target equipment 450. That is, for example, the target equipment may be associated with a pre-determined traversability threshold for the target site, where the traversability threshold is indicative of a site condition that provides for appropriate traversability of the target equipment (e.g., without potential problems as described above). In this example, if the traversability threshold is not met, as indicated by real-time data, an alert signal 418 can be generated to alert the operator. For example, the alert signal 418 may alert the operator that the target equipment may not effectively traverse the target site, and the operator can take appropriate action. As an example, the operator may choose to avoid the location of alert, may choose to select another piece of equipment, or may adjust the target equipment such that it meets the threshold. For example, for a tracked vehicle, the track tension may be adjusted; for a wheeled vehicle the tires may be deflated for greater tire coverage; or tires may be substituted for tracks; etc.

In one implementation, as illustrated in FIG. 4, the example system 400 can comprise a traversability updating component 422 that generates update data 420 indicative of updated site conditions identified by the site condition analyzing component 402. The traversability updating component 422 can automatically update the traversability map generation component 210 with the update data 420 based at least upon the real-time data (e.g., 410, 414) indicative of real-time site conditions related to traversability. Further, the traversability updating component 422 can provide update data 420 to the traversability determination component 202 to provide for site condition learning. That is, for example, the traversability map can be updated in real-time based on the update data 420, which is indicative of in-situ conditions in real time. In this way, the operator may be able to detect conditions that make traversability difficult, and/or use the updated map to alter a path for the target equipment. Additionally, the update data 420 can be used to train the traversability determination component 202 to provide more accurate results related to site traversability. As an example, the sensors 404 may be able to provide actual site conditions, which combined with the pre-determined site conditions, can provide for improved accuracy in future traversability determination for the target equipment.

Figure 5:
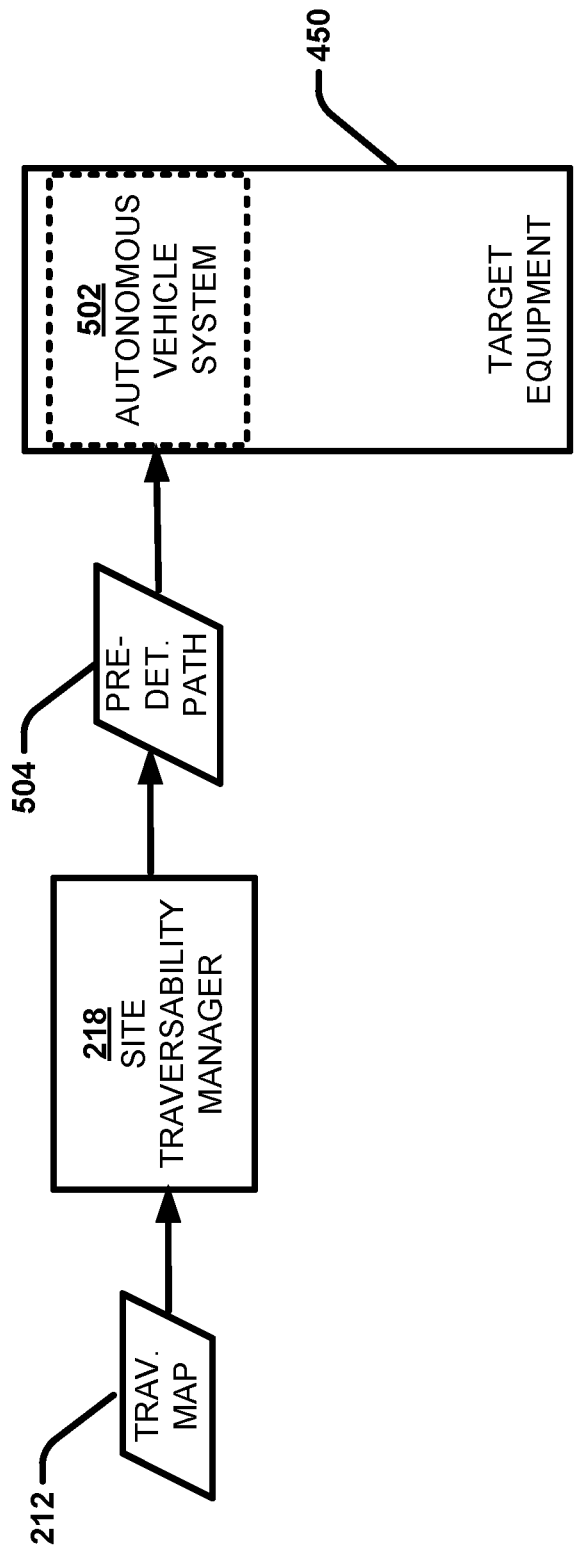
FIG. 5 is a schematic diagram illustrating one implementation of one or more portions of one or more systems described herein.

As illustrated in FIG. 5, in one implementation, the site traversability management component 218 can identify a pre-determined path 504 for the target equipment 450 to traverse based at least upon the traversability map 212. In this implementation, the example system can comprise an autonomous vehicle sub-system 502 that autonomously operates the target equipment 450 in accordance with the pre-determined path 504. As an example, the traversability map 212 can identify target sites in the target area where the target equipment 450 may effectively traverse. The autonomous vehicle system 502 can be used to autonomously (e.g., without direct human operation) operate the target equipment 450, such as a tractor operating in a farm field, or construction equipment operating in a construction site. In this implementation, the traversability management component 218 can set up the predetermined path 504, based on the traversability map, and a desired operation of the target equipment 450 (e.g., task assigned to the equipment). The autonomous vehicle system 502 can use the predetermined path 504 as a guide to autonomously operate the target equipment 450 along the pre-determined path 504.

Figure 6:
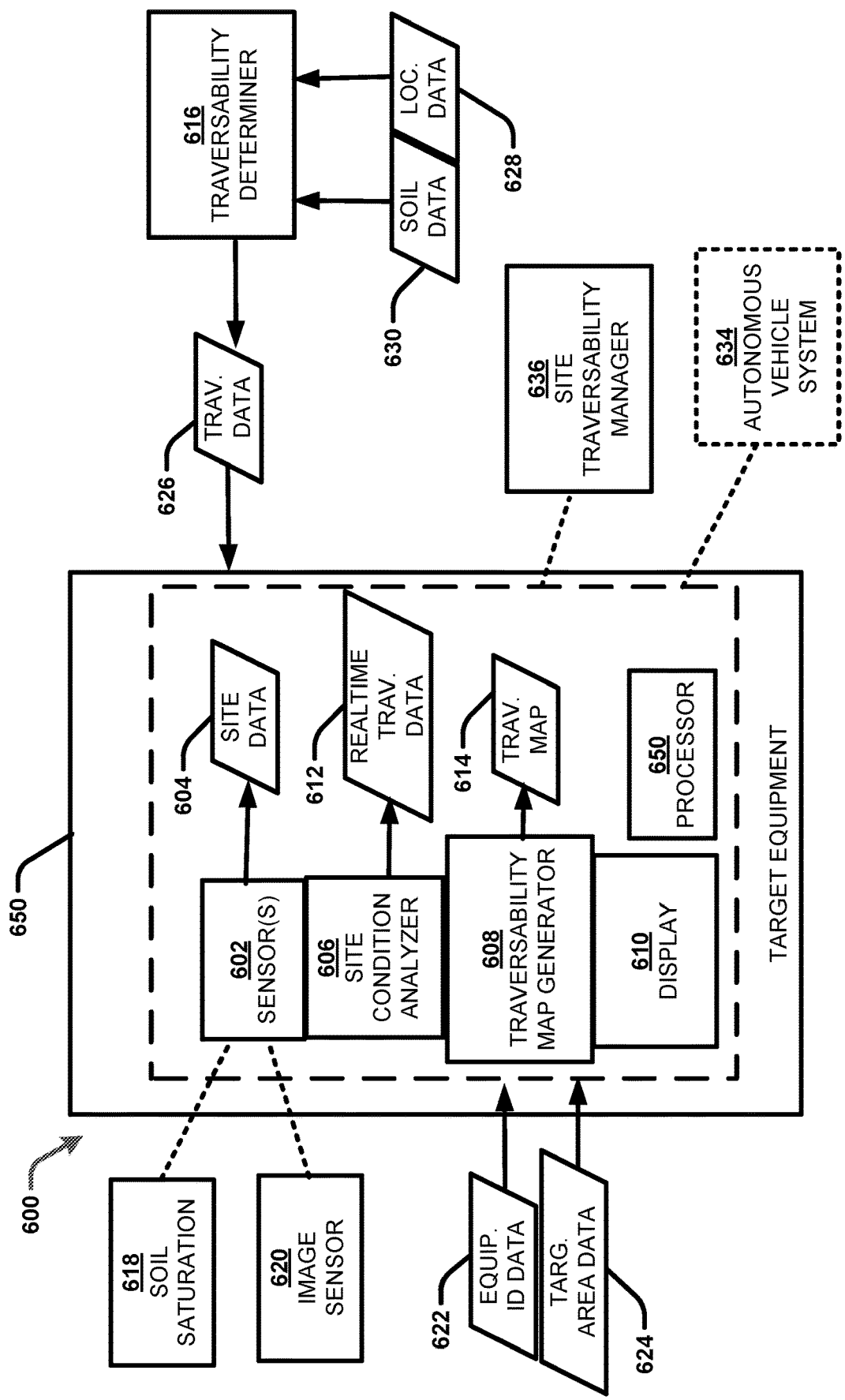
FIG. 6 is a schematic diagram illustrating an alternate implementation of a system for identifying traversability of a site by equipment.

In another aspect, as illustrated in FIG. 6, an example system 600 for identifying traversability of a site by equipment can comprise one or more sensors 602 disposed on target equipment 650. The one or more sensors 602 can detect one or more site conditions at a target site in real-time. The one or more sensors 602 can generate site condition 604 data that is indicative of the one or more site conditions related to traversability at the target site. Further, the example system 600 can comprise a site condition analyzing component 606 using a processor 616 to generate real-time site traversability data 612 indicative of real-time site traversability conditions based at least upon the site condition data 604. Additionally, the example system 600 can comprise a traversability map generation component 608 that generates a traversability map 614 of a target area for the target equipment 450 at the target site based at least on the real-time site traversability data 612. In this implementation, a display 610 can receive the traversability map 614 to render a visual representation of the traversability map 614 of the target area viewable by an operator of the target equipment 450.

As an example, an operator may be driving a tractor comprising the example, system 600. In this example, the sensors 602 can detect real-time, in-situ site conditions, such as soil conditions, terrain, moisture, wheel slippage, force, etc., and site data 604 can be generated by the sensors 602. The site condition analyzer 606 can identify real time traversability information, such as whether a traversability threshold has been met for the target equipment, using the real time data 604, and generate the real-time traversability data 612. The traversability map generator 608 can generate a real-time traversability map 614 based on the real time, in-situ conditions; ant the map 614 can be displayed to the operator on the display 610. In this way, the operator may make decision on effective traversability in real-time. Alternatively, an autonomous vehicle system may utilize the traversability map 614 to make appropriate traversability decisions on the fly.

In some implementations, the one or more sensors 602 can comprise a soil saturation sensor 618 that detects an amount of water present in the soil at the target site. Further, in some implementations, the one or more sensors 602 can comprise an image sensor 620 that detects soil conditions based at least on image data. For example, the detected moisture levels and/or soil conditions can be used to identify in-situ, real time site conditions for the target site.

In some implementations, the traversability map generating component 608 can generate the traversability map 614 for the target area comprising the target site based at least on site traversability data received from a traversability determination component 616. For example, the traversability determination component 616 (e.g., as described above for 202) can identify historical traversability data 626, which can be combined with the real-time traversability data 612 to help generate the traversability map 614. Further, the traversability map generating component 608 can generate the traversability map 614 for the target area comprising the target site based at least on equipment identification data 622 indicative of the target equipment, and/or the target area data 624 indicative of the target area that comprises the target site. Similarly, as described above, the traversability determination component 616 can generate the site traversability data 626 based at least on location data 628 indicative of a location of the target site, and soil data 630 indicative of soil conditions at the target site. In this implementation, the traversability data 626 is indicative of conditions at the target site related to traversability at the target site.

In some implementations, the example system 600 can comprise a site traversability management component 636 used to manage traversability of the target site. The traversability management component 636 can receive the traversability map 614 to determine traversability for the target equipment 650 at the target site. Further, the example system 600 can comprise an autonomous vehicle sub-system 634 that autonomously operates the target equipment 650 in accordance with a pre-determined path for the target equipment 650 to traverse based at least upon the traversability map 614.

Figure 7:
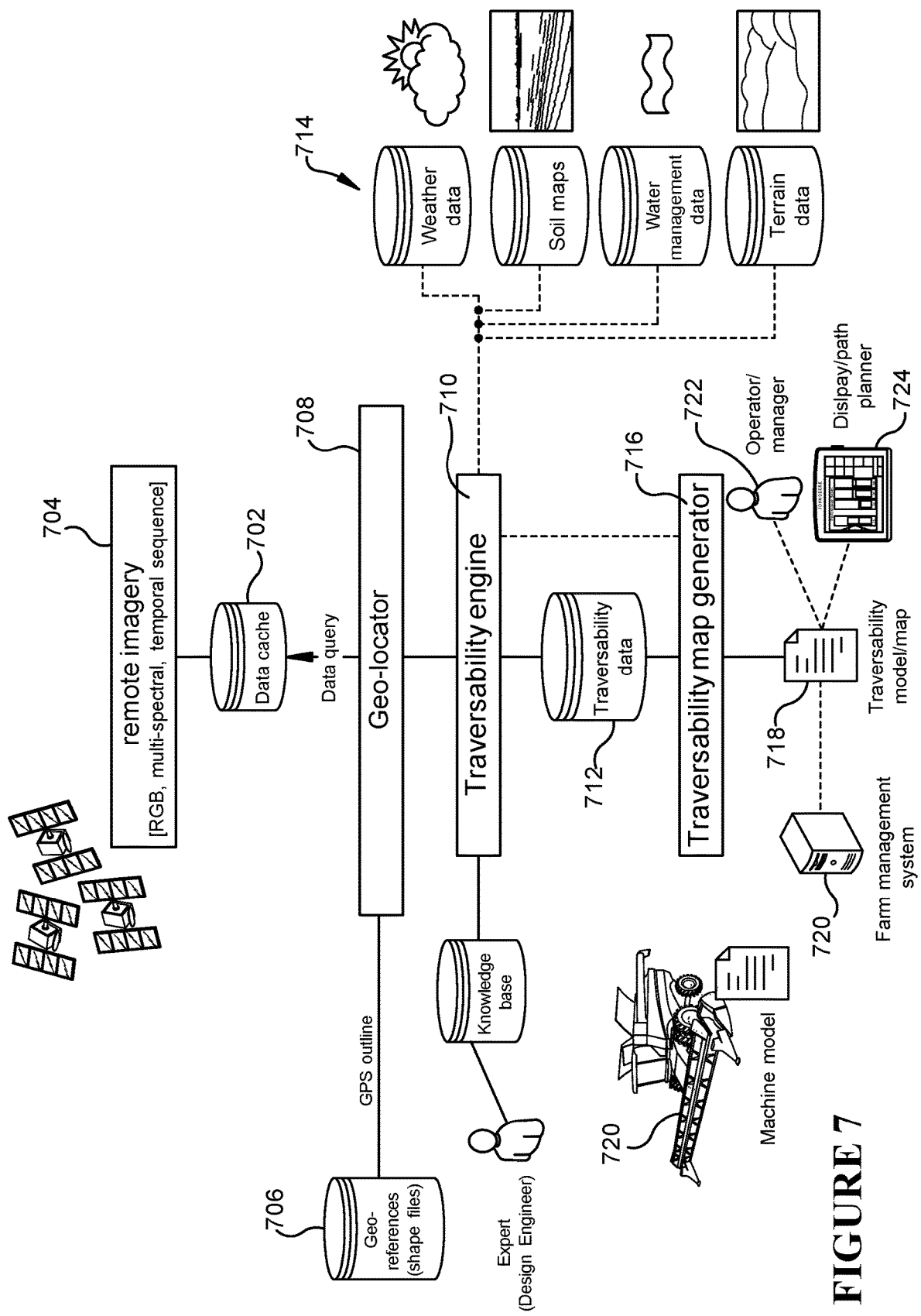
FIG. 7 is a component diagram illustrating one example implementation of one or more portions of one or more systems described herein.

FIG. 7 is a component diagram illustrating one example implementation of one or more portions of one or more systems described herein. A data cache 702, such as local or remote memory or data storage, can store remote imagery data 704, such as images of a target area comprising a target site. The imagery can comprise multi-spectral imagery, visible light imagery, temporal images (e.g., historical images), etc., which may be sourced from satellites and/or aerial vehicles. A geo-reference library can store data of shape files comprising surface geo-locations or features (e.g., plats, fields, etc.). A geo-locator 708 (e.g., GPS, mapping software, etc.) can collect location data for a target site, to identify corresponding geo-shape data and remote imagery 704 for the target site. A traversability engine 710 (e.g., traversability determination component) can generate traversability data 712, such as using site data and site maps 714 (e.g., weather, soil, water management, terrain). A traversability map generation component 716 can generate a traversability map/model 718 based on the traversability data 712, and equipment identification data 720. The traversability map/model 718 can be used by a farm management system 722, for example, to determine when certain target sites can be effectively traversed. An operator 724 can use the map 718, such as on a display 726, to identify an appropriate traversability path during operation of the target equipment.

Figure 8:
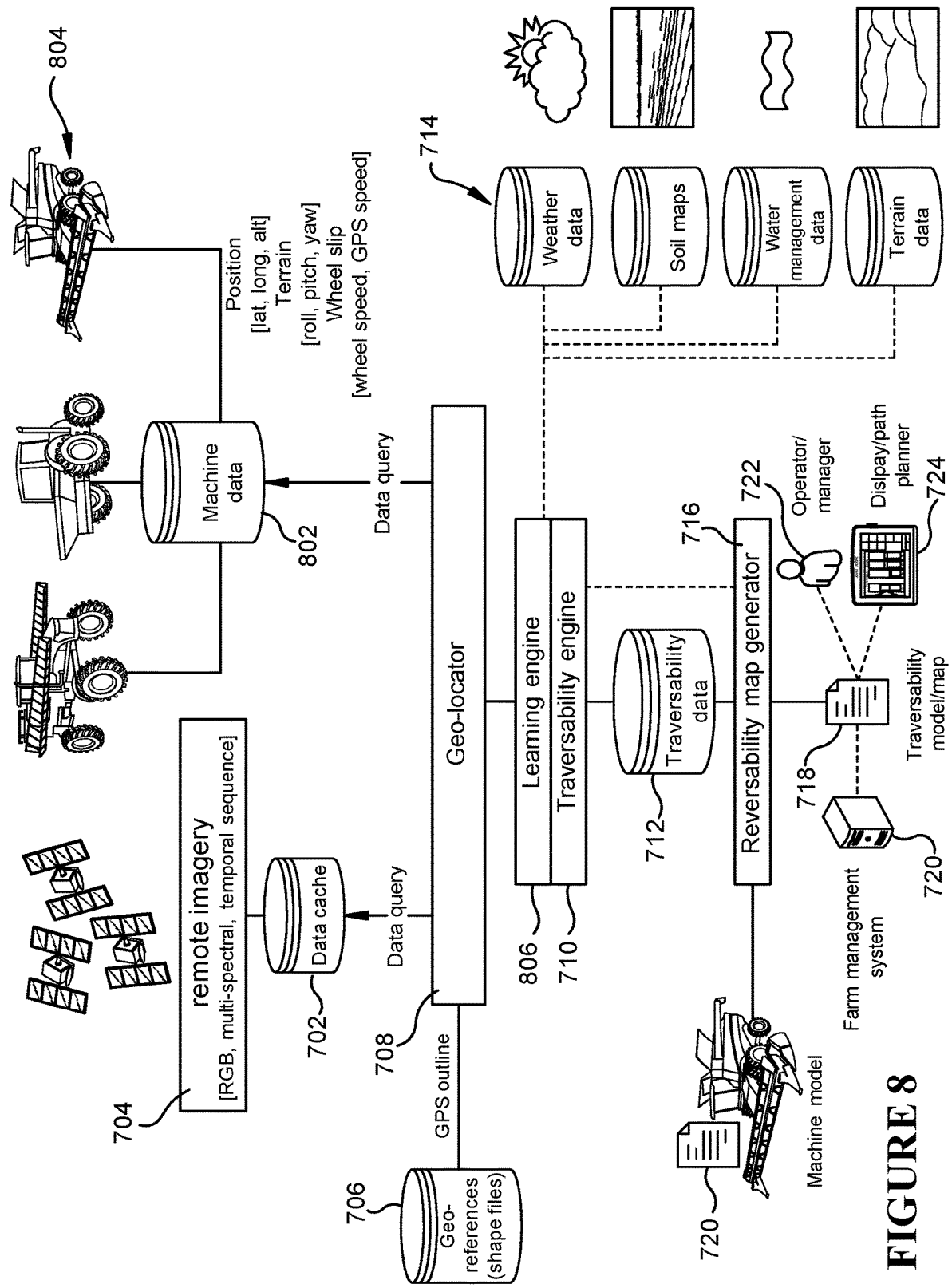
FIG. 8 is a component diagram illustrating one example implementation of one or more portions of one or more systems described herein.

FIG. 8 is component diagram illustrating an alternate implementation of one or more systems described herein. In this implementation, an equipment data library 802 can comprise local or remote memory or data storage, which stores data indicative of various type of equipment, machinery, vehicles, etc. 804 that may be the subject of a traversability inquiry. In this implementation, real-time in situ data can be loaded to a learning engine 806, which can update accuracy of the traversability data 712 based on real, in-situ conditions and vehicle operations. Further, the real, in-situ information can be uploaded to the equipment data library 802, such as the position, the terrain, and operational data, such as wheel slippage, force applied (e.g., downforce, draft force), speed of vehicle, along with site conditions. In this way, for example, the system may be able to provide more accurate traversability information 712 for similar or same types of equipment in similar or same conditions.

Figure 9:
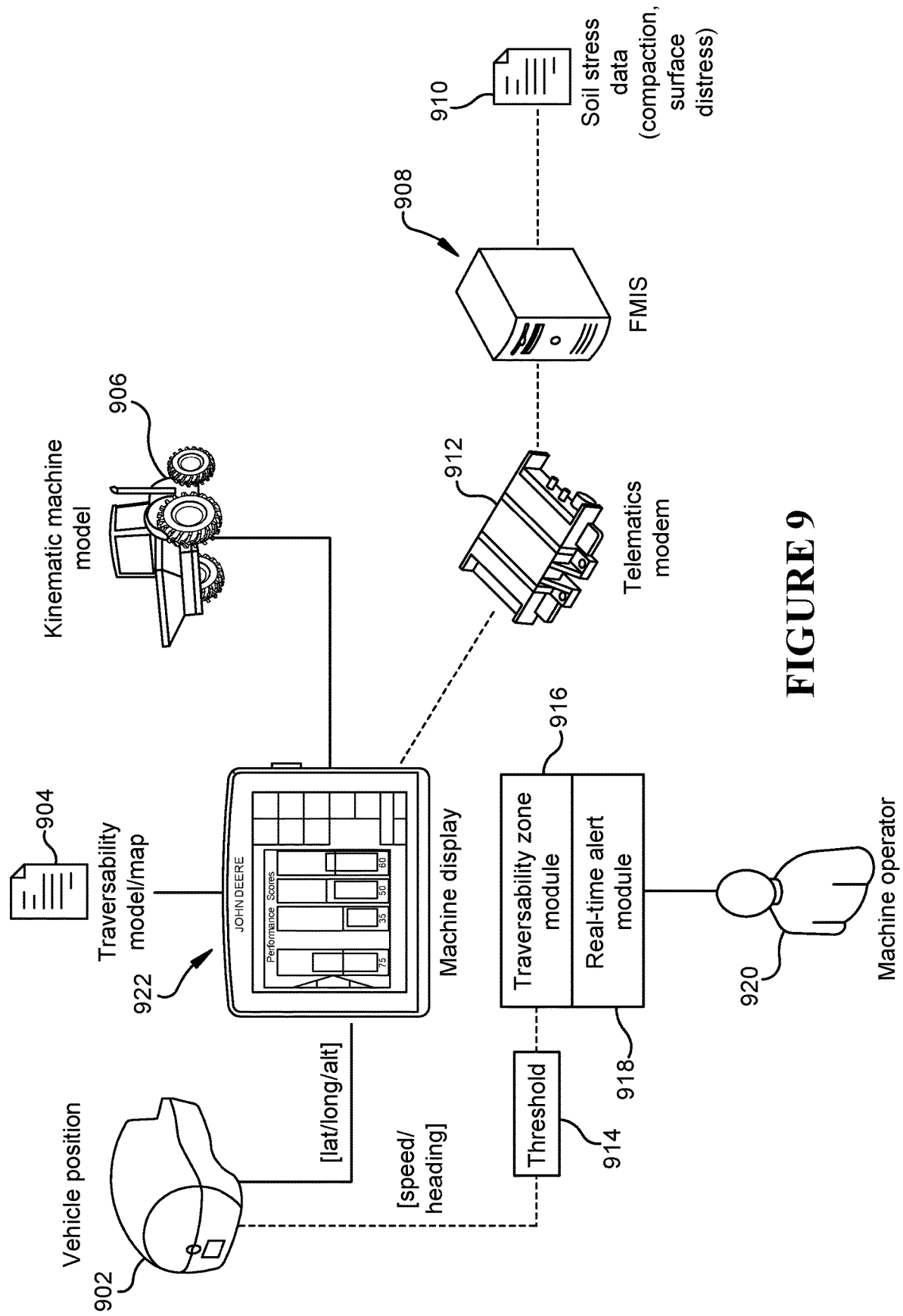
FIG. 9 is a component diagram illustrating one example implementation of one or more portions of one or more systems described herein.

FIG. 9 is component diagram illustrating an alternate implementation of one or more systems described herein. In this implementation, a vehicle positioning component (e.g., GPS) provides vehicle location data to a traversability zone data module 916. The traversability zone data module 916 identifies a zone of traversability, such as displayed on the traversability map on a display 922. The zone of traversability may be defined by a traversability threshold 914, which is indicative of conditions that allow the equipment to traverse the target site, based on the equipment specification data 906 and the traversability map/model 904. Soil data 910 can be provided by the site traversability management component 908, such as using a remote communications component 912, such as a wireless transmitter. A real-time alert signal 918 can be provided to the operator 920 of the equipment if the equipment travels outside of the traversability zone. 916.

Figure 10:
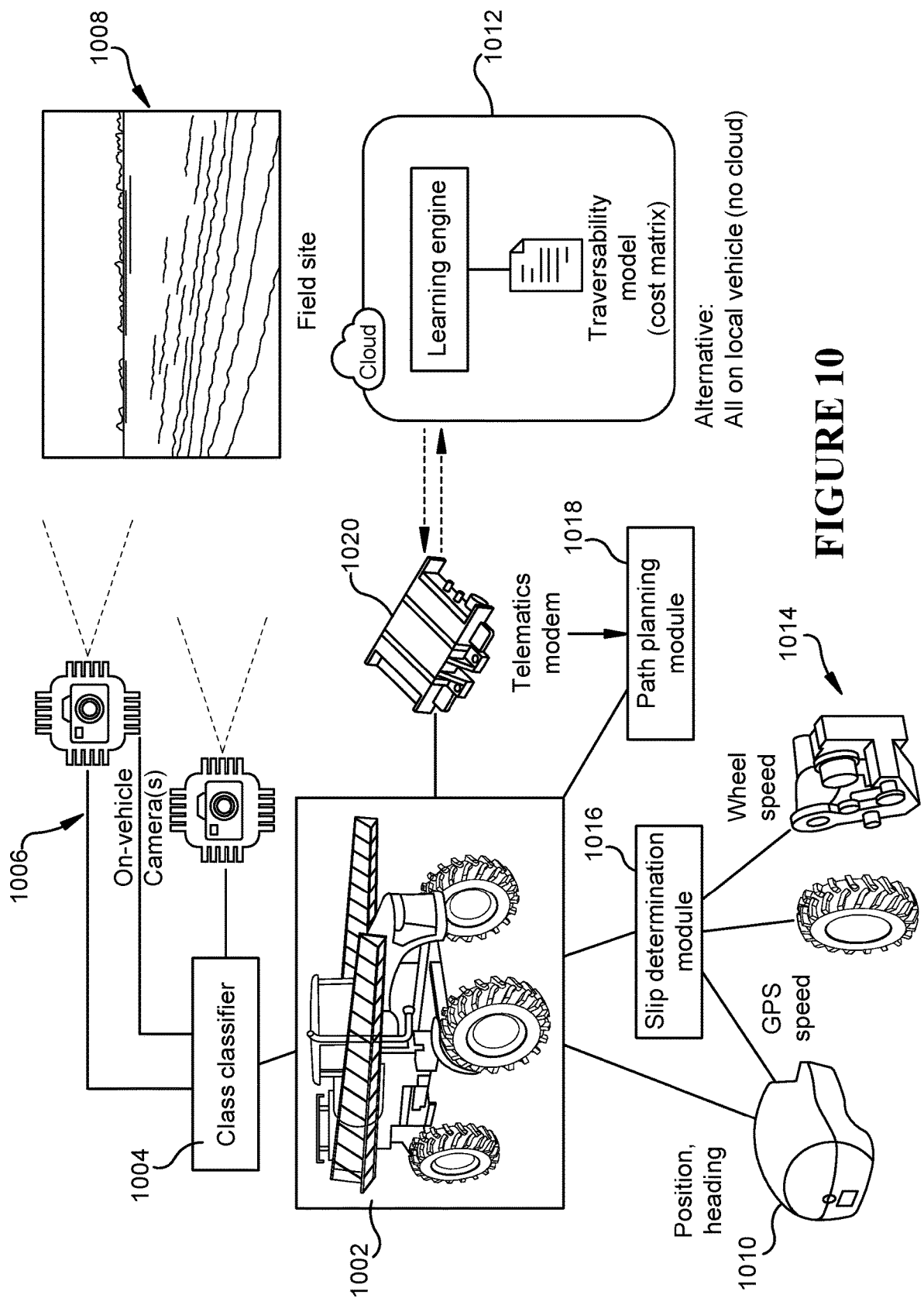
FIG. 10 is a component diagram illustrating one example implementation of one or more portions of one or more systems described herein.

FIG. 10 is component diagram illustrating an alternate implementation of one or more systems described herein. In this implementation, the target equipment 1002 can be traversing (or planning to traverse) a target site 1008, such as a farm field. On-board image sensor 1006 may be used to collect images of the target site 1008, and a site classifier can determine a type of site for the target site 1008 (e.g., based on terrain, soil conditions, etc.). The equipment location can be determined by an on-board locator 1010, and used to help determine a path using a path planning module 1014. During operation, a slip determination module 1016 can identify wheel or transmission slip using sensor 1014 (e.g., or determined using indirect measurements as described above), and identify the location of slip using the locator 1010. The information may be transmitted to a learning engine 1012 (e.g., either locally or remotely disposed), using a communications module 1020. The learning engine 1012 can use the identified slip data, in combination with the site classification information, to more accurately predict an appropriate traversability path for the equipment 1002.

Figure 11:
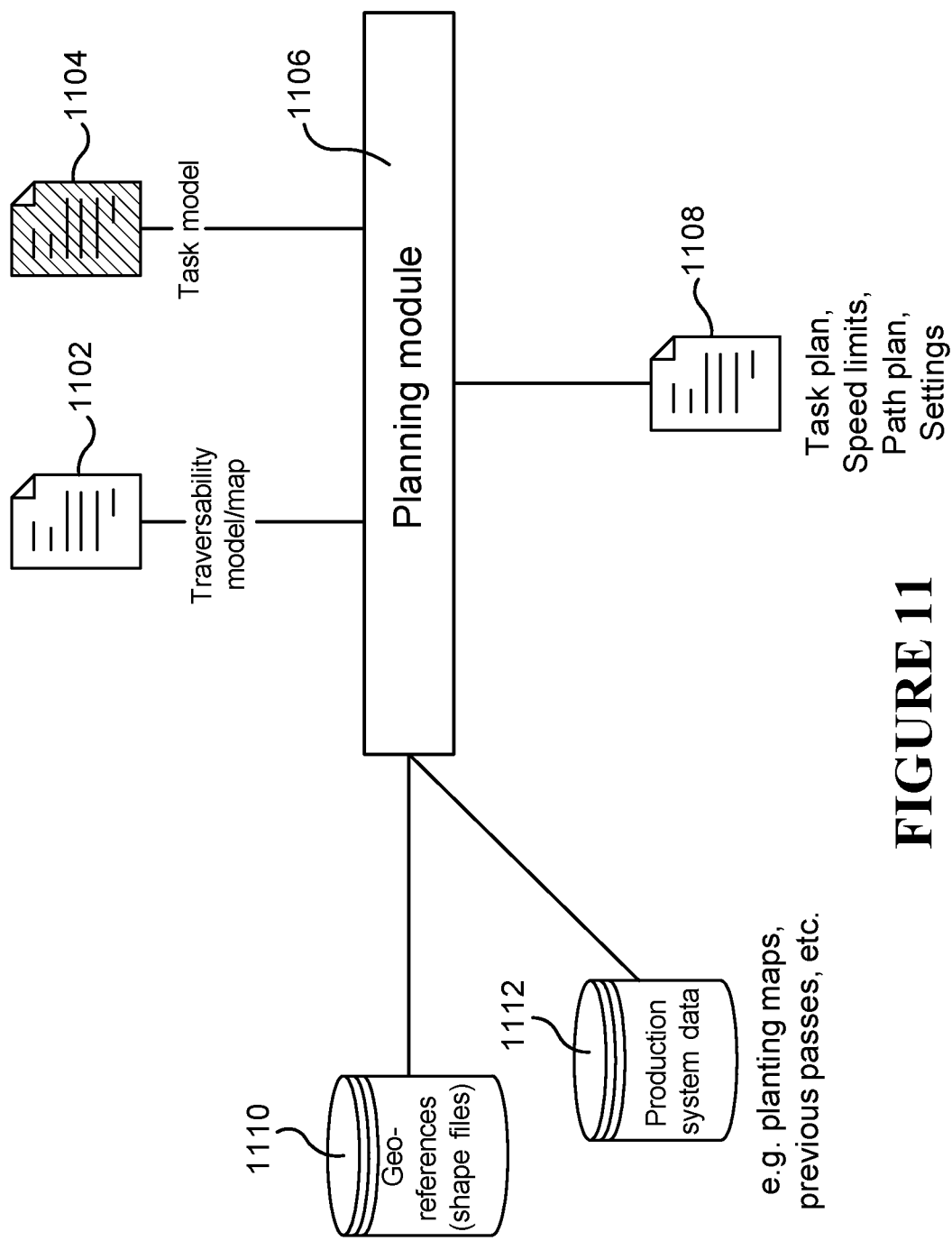
FIG. 11 is a component diagram illustrating one example implementation of one or more portions of one or more systems described herein.

FIG. 11 is component diagram illustrating an alternate implementation of one or more systems described herein. In this implementation, the traversability map/model 1102 be used by a planning module 1106 to develop a task plan/map 1108 for target equipment at a target site. In this implementation, a task model 1104 can be input to the planning module 1106, where the task model comprises information related to tasks for the target site, such as tilling, planting, spraying, harvesting, etc. Further, geo-reference data 1110 can comprise information related to the target site, such as shapes and locations of fields for the task model. The geo-reference data 1110 can be input to the planning module 1106, along with production system data 1112. The production system data can comprise data indicative of field production, such as planting maps, paths of previous vehicle passes, etc. The planning module 116 can develop a task plan/map that identifies timing, locations, paths, speed limits, equipment settings, and other information used to operate the equipment appropriately to perform the desired tasks in the task model 1104. As an example, this information can be used by an operator to operate the equipment, or loaded to an autonomous vehicle system to autonomously operate the vehicle.

Figure 12:
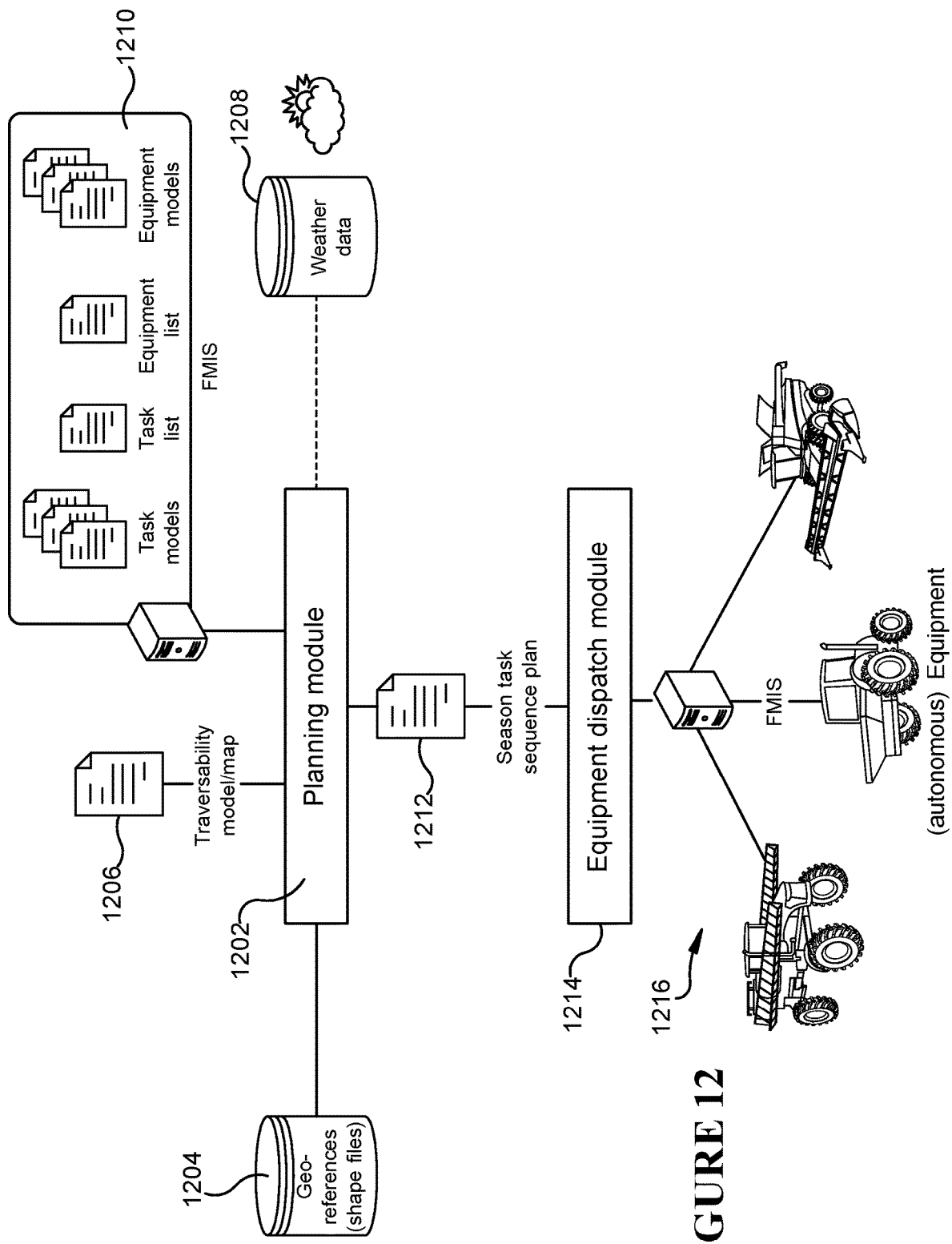
FIG. 12 is a component diagram illustrating one example implementation of one or more portions of one or more systems described herein.

FIG. 12 is component diagram illustrating an alternate implementation of one or more systems described herein. In this implementation, a planning module 1202 can receive geo-reference data 1204 for the target site, the traversability map/model, weather data 1208, and task/equipment information data 1210. The task/equipment information data 1210 can comprise information identifying the desired tasks, and task models (e.g., from FIG. 11), along with equipment specifications, and equipment models that identify tasks associated with specific equipment, at target sites. The planning module 1202 generates a task plan 1212 for a desired period, such as a planting season. The task plan 1212 can identify which equipment can be used at which times, and for which purposes, according to the traversability map, task models, weather, equipment spec, and location data. The task plan 1212 identifies and updates a schedule accordingly (e.g., based on task plan times, soil conditions, weather, etc.). An equipment dispatch module 12214 can be communicatively coupled with an autonomous equipment management system 1216, which can dispatch the target equipment to perform the tasks, at the target sites, at the appropriate times.

Various operations of implementations are provided herein. In one implementation, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each implementation provided herein.

As used in this application, the terms "component," "module," "system," "interface," and the like can refer to a computer-related entity, either hardware, a combination of hardware and software, software, or software in execution. For example, a component may be, but is not limited to being, a process running on a processor, a processor, an object, an executable, a thread of execution, a program and/or a computer. By way of illustration, both an application running on a controller and the controller can be a component. One or more components may reside within a process and/or thread of execution and a component may be localized on one computing device and/or distributed between two or more computing devices. For example, instructions and data can be stored in memory, and executed by a processor to perform the functions of a component or module.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Furthermore, the claimed subject matter may be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device, carrier or media. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A system for identifying traversability of a site by equipment, the system comprising:
    a traversability determination component using a processor to generate traversability data based at least on:
        location data indicative of a location of a target site; and
        soil data indicative of soil conditions at the target site stored in memory;
    wherein the traversability data is indicative of conditions at the target site related to traversability at the target site;
    a traversability map generation component generating a traversability map for a target area comprising the target site based at least on:
        traversability data received from the traversability determination component;
        equipment identification data indicative of target equipment specifications for traversing the target site, the indicated target equipment specifications comprising one or more of:
            ground contact type for the equipment;
            torque provided at each axle of the equipment;
            towing capacity of the equipment; and
            downforce capacity for the equipment; and
        target area data indicative of a desired target area that comprises the target site; and
    one or more of:
        a site traversability management component used to manage traversability of the target site, the site traversability management component receiving the traversability map resulting in a determination of target site traversability for the target equipment; and
        a display receiving the traversability map to render a visual representation of the traversability map of the target area viewable by an operator of the target equipment.

2. The system of claim 1, the traversability determination component generating traversability data based at least on weather data indicative of weather at the target site.

3. The system of claim 1, the traversability determination component generating traversability data based at least on terrain data indicative of terrain at the target site.

4. The system of claim 1, the traversability determination component generating traversability data based at least on moisture data indicative of soil moisture level at the target site.

5. The system of claim 1, comprising a site condition analyzing component comprising a sensor array to detect one or more site conditions in real-time, the site condition analyzer generating real-time data indicative of real-time site conditions related to traversability.

6. The system of claim 5, the site condition analyzing component comprising an image sensor that uses one or more of the following to generate image data:
    a visible light detector;
    an infrared light detector;
    a polarized light detector;
    an electromagnetic wave detector;
    an active acoustic imaging sensor; and
    a laser light detector.

7. The system of claim 5, the site condition analyzing component generating real-time data indicative of real-time site conditions related to traversability based at least on real-time wheel slip data received from one or more wheel slip sensors disposed on the target equipment, and the wheel slip data indicative of an amount of wheel slippage of one or more wheels of the target equipment.

8. The system of claim 5, the site condition analyzing component generating real-time data indicative of real-time site conditions related to traversability based at least on real-time force data received from a force sensor disposed on the target equipment, the downforce data is indicative of an amount of downforce and/or draft force applied by a piece of towed equipment to the target equipment.

9. The system of claim 5, comprising an alert signal indicating a real-time alert to the operator in response to the real-time data indicating a pre-determined traversability threshold is not met for the target equipment.

10. The system of claim 5, comprising a traversability updating component that performs one or more of:
    automatically updates the traversability map with update data based at least upon the real-time data indicative of real-time site conditions related to traversability; and
    provides update data to the traversability determination component to provide for site condition learning.

11. The system of claim 1, the site traversability management component identifying a pre-determined path for the target equipment to traverse based at least upon the traversability map.

12. The system of claim 11, comprising an autonomous vehicle sub-system that autonomously operates the target equipment in accordance with the pre-determined path.

13. A system for identifying traversability of a site by equipment, the system comprising:
    one or more sensors disposed on target equipment, the one or more sensors detecting one or more site conditions at a target site in real-time and generating site condition data indicative of the one or more site conditions related to traversability at the target site;
    a site condition analyzing component using a processor to generate real-time site traversability data indicative of real-time site traversability conditions based at least upon the site condition data;
    a traversability map generation component generating a traversability map of a target area for the target equipment at the target site based at least on the real-time site traversability data and an identification of the target equipment that indicates specifications of the target equipment, wherein the indicated specifications of the target equipment comprise one or more of:
ground contact type for the equipment;
torque provided at each axle of the equipment;
towing capacity of the equipment; and
downforce capacity for the equipment; and
a display receiving the traversability map to render a visual representation of the traversability map of the target area viewable by an operator of the target equipment.

14. The system of claim 13, the one or more sensors comprising a soil saturation sensor that detects an amount of water present in the soil at the target site.

15. The system of claim 13, the one or more sensors comprising an image sensor that detects soil conditions based at least on image data.

16. The system of claim 13, the traversability map generating component generating the traversability map for the target area comprising the target site based at least on:
site traversability data received from a traversability determination component;
equipment identification data indicative of the target equipment; and
target area data indicative of the target area that comprises the target site.

17. The system of claim 16, comprising the traversability determination component that generates the site traversability data based at least on:
location data indicative of a location of the target site; and
soil data indicative of soil conditions at the target site;
wherein the traversability data is indicative of conditions at the target site related to traversability at the target site.

18. The system of claim 13, comprising a site traversability management component used to manage traversability of the target site, the traversability management component receiving the traversability map resulting in a determination of traversability of the target equipment at the target site.

19. The system of claim 13, comprising an autonomous vehicle sub-system that autonomously operates the target equipment in accordance with a pre-determined path for the target equipment to traverse based at least upon the traversability map.

20. A property traversability management system for managing use of equipment in a target property, comprising:
a traversability management component used to manage traversability of one or more target sites at a target property, the traversability management component identifying appropriate times and locations for target equipment to operate at respective one or more target sites based at least on a traversability map that comprises the one or more target sites;
a traversability map generation component that generates the traversability map based at least on:
pre-determined traversability data for the respective one or more target sites;
real-time traversability data for at least one of the one or more target sites;
equipment identification data indicative of the specifications of the target equipment, the indicated target equipment specifications comprising one or more of:
ground contact type for the equipment;
torque provided at each axle of the equipment;
towing capacity of the equipment; and
downforce capacity for the equipment; and
a desired target area that comprises one or more of the one or more the target sites;
a traversability determination component using a processor to generate the pre-determined traversability data based at least on:
location data indicative of a location of the one or more target sites; and
soil data indicative of soil conditions at the respective one or more target sites;
wherein the traversability data is indicative of conditions at the target site related to traversability at the target site; and
a site condition analyzing component comprising one or more sensors disposed on the target equipment to detect one or more site conditions in real-time, the site condition analyzer generating real-time data indicative of real-time site conditions related to traversability for the at least one of the one or more target sites.

* * * * *